(12) United States Patent
Zurov et al.

(10) Patent No.: US 7,315,655 B2
(45) Date of Patent: Jan. 1, 2008

(54) METHOD OF DATA COMPRESSION INCLUDING COMPRESSION OF VIDEO DATA

(75) Inventors: Andrey V. Zurov, St. Petersburg (RU); Sergey V. Novikov, St. Petersburg (RU); Alexander P. Tanchenko, St. Petersburg (RU)

(73) Assignee: Comet Technologies LLC, Cleveland, OH (US)

( * ) Notice: Subject to any disclaimer, the term of this patent is extended or adjusted under 35 U.S.C. 154(b) by 204 days.

(21) Appl. No.: 11/170,830

(22) Filed: Jun. 30, 2005

(65) Prior Publication Data
US 2006/0002613 A1 Jan. 5, 2006

Related U.S. Application Data

(60) Provisional application No. 60/584,102, filed on Jun. 30, 2004.

(51) Int. Cl.
*G06K 9/46* (2006.01)
(52) U.S. Cl. ...................................... 382/240
(58) Field of Classification Search ........ 382/232–233, 382/240, 244–251, 266; 375/240.01–240.25
See application file for complete search history.

(56) References Cited

U.S. PATENT DOCUMENTS

| | | | |
|---|---|---|---|
| 5,321,776 A | 6/1994 | Shapiro | |
| 5,412,741 A * | 5/1995 | Shapiro | 382/232 |
| 5,764,807 A | 6/1998 | Pearlman et al. | |
| 6,442,204 B1 | 8/2002 | Snook et al. | |
| 6,445,832 B1 * | 9/2002 | Lee et al. | 382/266 |
| 6,466,698 B1 * | 10/2002 | Creusere | 382/240 |
| 6,647,060 B1 | 11/2003 | Ueda | |
| 6,956,973 B1 * | 10/2005 | Liang et al. | 382/240 |

OTHER PUBLICATIONS

International Search Report, PCT/US05/23109, mailed Dec. 4, 2006.
International Search Report, PCT/US05/23133, Mailed Apr. 19, 2006.

* cited by examiner

*Primary Examiner*—Ishrat Sherali
(74) *Attorney, Agent, or Firm*—Fay Sharpe LLP

(57) ABSTRACT

A data processing system includes a subband decomposition of a source signal by encoding of the significant pyramid-type subband representation. During the encoding process, M-array is used for initialization of set of arrays $S_i$ (arrays of solution bits), which define the order of creating output data streams. Output data streams contain an encoded significance map and values of (significant) non-zero subband decomposition coefficients adapted for successive quantization and entropy encoding.

5 Claims, 12 Drawing Sheets

Figure 1:
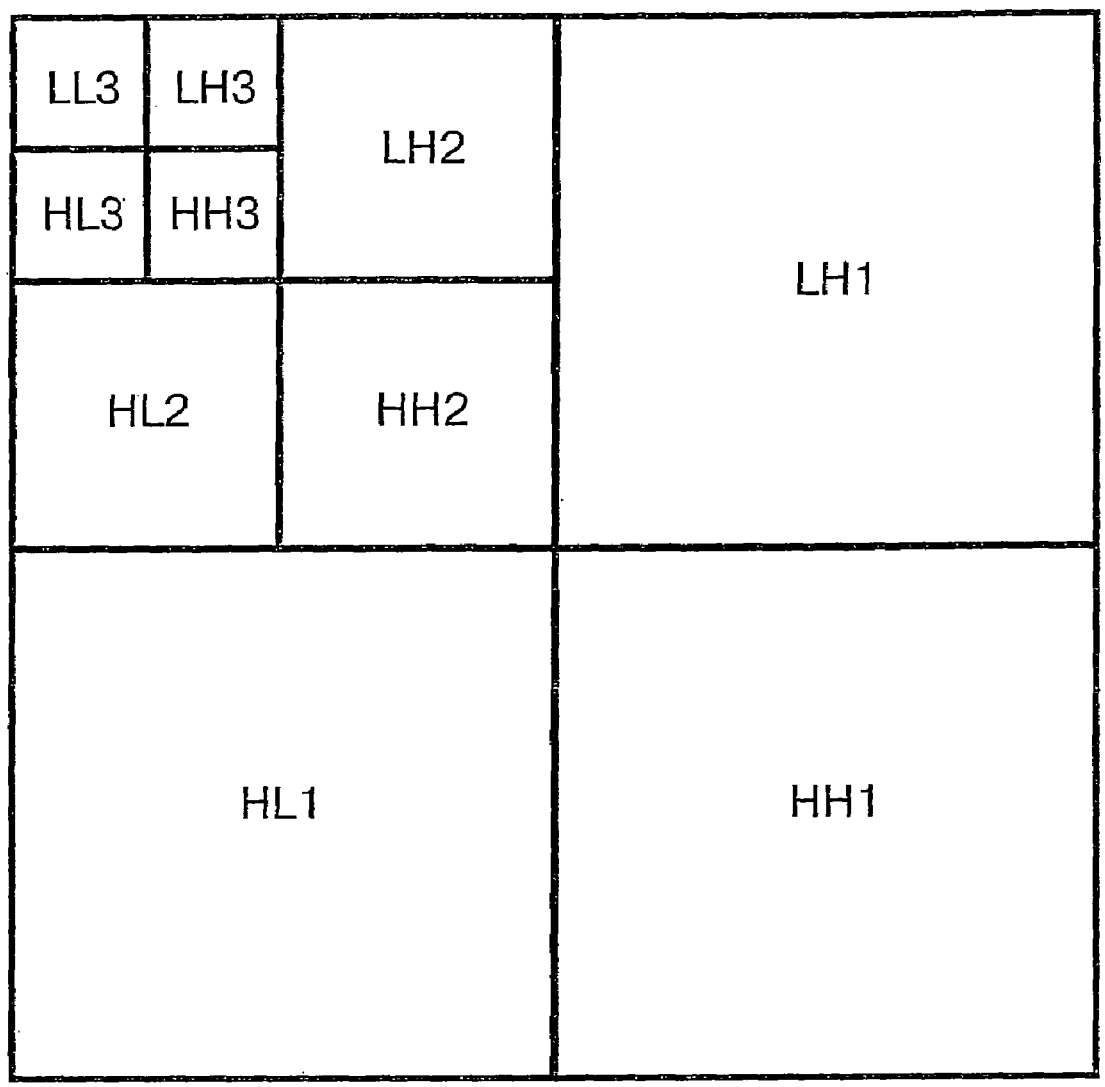

Stage 1.1 Static frames conversion from RGB to YUV format

Stage 1.2 Processing using wavelet filters

Stage 1.3 Preliminary graph processing

Stage 1.4 Conversion into bit planes

Stage 1.5 Analysis and processing of bit planes

Stage 1.6 Organizing data in the flows

Stage 1.7 Generating united flow

Structural Scheme of Program System

Description of Program System:

METHOD OF DATA COMPRESSION INCLUDING COMPRESSION OF VIDEO DATA

INCORPORATION BY REFERENCE

U.S. Pat. No. 5,321,776 to Shapiro and U.S. Pat. No. 5,764,807 to Pearlman et al. are both hereby incorporated by reference in their entirety.

Reference is also made to U.S. patent application Ser. No. 11/170,831, filed Jun. 29, 2005, entitled, "METHOD OF VIDEO DATA TRANSMITTING", by Andrey V. Zurov et al.

The present application claims the benefit of Provisional Patent Application No. 60/584,102, filed Jun. 30, 2004.

The disclosure of both above-identified applications are incorporated herein in their entirety, by reference.

DESCRIPTION

1. Field of the Invention

The invention lies in the field of data compression technique, in particular, it can be used for image and video data compression.

2. Background of the Invention

At present different means and methods are used for data compression. When solving the problems of image data transmission in photo or video formats and video data, the choice of this or that compression method is determined by the set of requirements for the quality of the image behind transmitted and by data transfer rate limitations. If an image is transferred using the channel with low capacity, the main factor for the choice of optimal data compression method is its capability to determine significant data out of the general data flow and re-organize the information being transmitted so that the significant image data get the priority when being sent using the transmission channel. In general, any data compression methods should decrease greatly the abundance of the information being transmitted in order to transmit the data with the highest authenticity degree using the minimal possible number of bits necessary for forming, transmitting and following recording of the data flow.

Currently the widest prospects of practical use have image data compression methods based on the pyramidal presentation of initial image decomposition coefficients in spatial-scale subbands. Such pyramidal representation can be achieved by means of multi resolution analysis. The result of the mentioned analysis is creating of hierarchical tree that has one root and a final number of nodes connected to it, called descendants. As the ground for decomposition, the wavelet functions family is used (see "An Embedded Wavelet Hierarchical Image Coder" Jerome M. Shapiro, International Conference of Acoustic, Speech and Signal Processing, Mar. 1992). The image spectrum, received as the result of wavelet transformation application, due to the peculiarities of the ground applied, enables receiving information not only about the array of initial data in general, but about its separate parts as well. This feature applied to the image allows using methods of controlled data compression for separate parts of the image.

The peculiarity of spectrum coefficients of image data decomposition is the statistically true tendency their decrease with the increase in spatial frequency. At this the simplest, but evidently not optimal compression method, is filtering of the array of image spectrum coefficients by means of their comparison to one another with the set threshold value and the following declaration of the coefficients, the values of which are less than the threshold value, "insignificant" for the following encoding. There are methods with deeper analysis of spectrum coefficients "significance". In particular, there is a method of data compression (the U.S. Pat. No. 5321776, issued at Jun. 14, 1994) based on the consistent examination of the tree nodes and detection of so called "positive symbol" in case the decomposition coefficient in this node is significant, i.e. the coefficient exceeds the threshold level and is positive; a "negative symbol" indicates that the spectrum coefficient in the node is significant and negative; "isolated zero symbol" for the node for which spectrum coefficient is insignificant, i.e. does not exceed the threshold level, but which has at least one descendant, the spectrum coefficient of which, in its turn, exceeds the threshold level; and "zero tree symbol" for the node which spectrum coefficient is insignificant and which has no single descendant, the spectrum coefficients of which are significant for the threshold level.

In order to increase the compression degree and data processing rate, the method of hierarchal tree division into multitudes of groups sorting out of the hierarchal tree was introduced (see the U.S. Pat. No. 5764807, issued at Jun. 9, 1998). In this patent the method of data encoding is described, according to which when consistently examining the tree from root to descendants, the decomposition spectrum coefficients is each node are compared to the current value of the threshold; after that they are added to one of the three groups: group of significant, i.e. exceeding the threshold coefficients; group of insignificant coefficients, i.e. coefficients the values of which are less than the threshold value; and group of insignificant descendants multitude. The mentioned group of insignificant coefficients multitude is characterized by its own root node and internal hierarchal tree that is created within the spectral subband. This method includes the check-up operation for significance of root node descendants in each multitude of insignificant coefficients in cases when the spectrum coefficient of significant descendant of the root node descendants is at least equal to the set threshold value. At that, for each root node of insignificant coefficients multitude, which has at least one significant descendant, the descendants of root node descendant is checked for significance in cases when the spectrum coefficient of significant descendant of the root node descendants is at least equal to the set threshold value.

The central concept of the said methods is the notion of "zero tree". The tree is considered to be zero for the threshold if spectrum coefficients related to all tree nodes including the root are insignificant. Both methods consider the set of thresholds and encode the whole tree-like structure for each set. At that, data compression is achieved due to the fact that, for encoding of zero tree, it is necessary to encode the coordinates of its apex only; that is why the more zero trees the hierarchal structure of spectrum coefficient of data decomposition contains, the more compact and effectively this structure is encoded.

Encoding of data flow with the help of well-known methods has a drawback that is most vividly revealed when transmitting information using low capacity channels, for example, wireless communication channels. The essence of this drawback is low quality of image restored after transmission. The reason for the drawback is that when realizing the methods described above, the flow being transmitted is formed out of initial distribution of spectrum decomposition coefficients without any preliminary reorganization. Besides, spectrum coefficient in different scales and in different frequency subband in the mentioned methods are equivalent. The last reason means that when forming the data flow, the largest coefficients are transmitted in the first place regardless of which subband they belong to. At such approach, if a great number of large coefficients are concentrated in high frequency subbands (it happens if an image contains many small contrast details), they will get into the outer flow in the first place.

Consequently, at the beginning of the flow, data of small contrast details, which are, as a rule, of little importance, will be transmitted; data of main low frequency and more important changes will get into the flow later and may be lost or transmitted with lower accuracy.

The objective of the invention is quality improvement of image being transmitted.

SUMMARY OF THE INVENTION

The claimed method is an encoding procedure of a hierarchal system of initial image spectrum decomposition coefficients with the help of a wavelet subband filter. As the result of the wavelet transformation applied consequently to lines an columns of an image, the spectrum coefficients' subbands D are formed. Successive application of such transformation to a low frequency subband at each decomposition level forms a hierarchal structure of coefficients. To each coefficient in the hierarchal structure, the coefficients correspond with a higher degree of precision. At that, the coefficient, which corresponds to the previous decomposition level is called an "ancestor"; coefficients, which correspond to the next decomposition level and related to the "ancestor", are called its "descendants". Coefficients of spectrum decomposition are real numbers and are characterized by modulus and sign. When encoding data within the claimed method, bit array of the sings of initial image decomposition spectrum coefficients Z is formed; the components of the array have 0 values if corresponding spectrum coefficient of decomposition D is nonnegative. Components of the array of the same signs are equal to 1 in cases where the corresponding spectrum coefficients of decomposition are negative.

Then the decomposition coefficients are evaluated by significance criterion and, for this purpose, are an indexed set of threshold arrays $T_i$, where i is an array index. Array $T_0$ is a basic threshold array. When an array index increases by 1, the values of arrays components in the set decrease twice $T_i=T_0/2^i$. The essential attribute of the claimed method is the procedure of reorganization of spectrum coefficients array. For its realization, so-called "rival array" of coefficients M is formed. The formation of the array is carried out by successive transition from tree nodes corresponding to the last decomposition level, which do not have the descendants, to their ancestor. At that transition the ancestor is given the value of the maximum coefficient from the coefficients-descendants of the node at all spectrum subbands of decomposition, rationed by the value of the corresponding threshold $T_0$.

Then the claimed method contains the procedure of indexed bit arrays $S_i$ set formation, components of which regulate the order of priority of sending data to the flow. Components of the arrays are declared zero, when the value of spectrum coefficient of rival array M in the tree node is less than threshold value $T_i$. In case the value of spectrum coefficient of rival array exceeds or is equal to threshold value, component of the array is declared to be equal to 1. Then the array of spectrum coefficients D of initial image decomposition is transformed into bit code represented by arrays set $B_i$, after that the resulting data flow is formed as a set of coefficients of the mentioned above arrays.

For the purpose of additional data compression on the account of correlations between the mentioned coefficients, the indexed set of vector arrays $V_i$ is formed, components of which for any chosen tree node are the components of $S_i$ and $B_i$ arrays on the descendants of the given node and components of Z array on the descendants of the given node, for which $B_i=1$. Then the data flows of the mentioned arrays are formed and are subject to entropy coding for the purpose of elimination of excessiveness.

Besides, in the claimed invention, in order to improve the quality of the image being transmitted, it is proposed to form a basic threshold array by means of increasing the values of its coefficients twice at each transition to spectrum subband of higher level.

The claimed succession of operations of the method secures the quality improvement of image data transfer at the expense of data reorganization and increased number of zero trees, and also at the expense of ascribing image spectrum low frequency constituents to the beginning of the flow.

SHORT DESCRIPTION OF THE DRAWING

On FIG. 1 the scheme of multilevel spectrum coefficients into subbands accoridng to the principles of the invention is shown.

Figure 2:
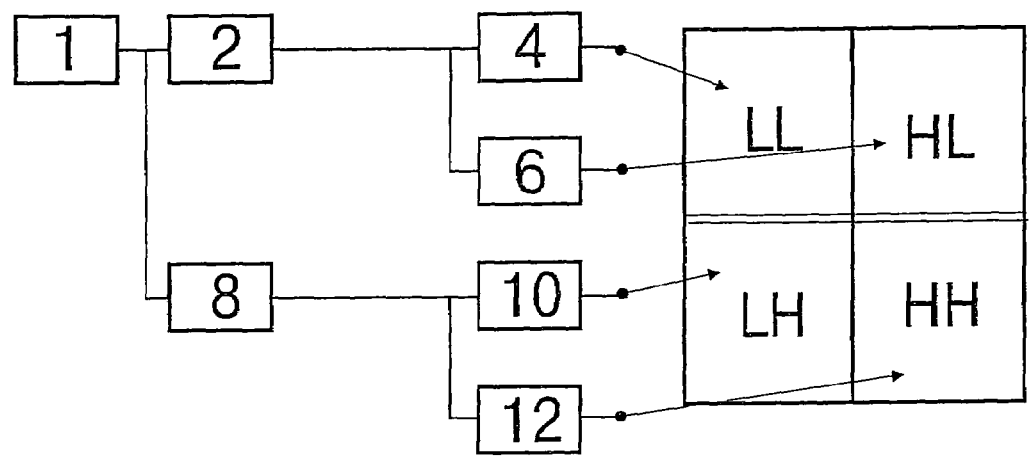
Figure 3:
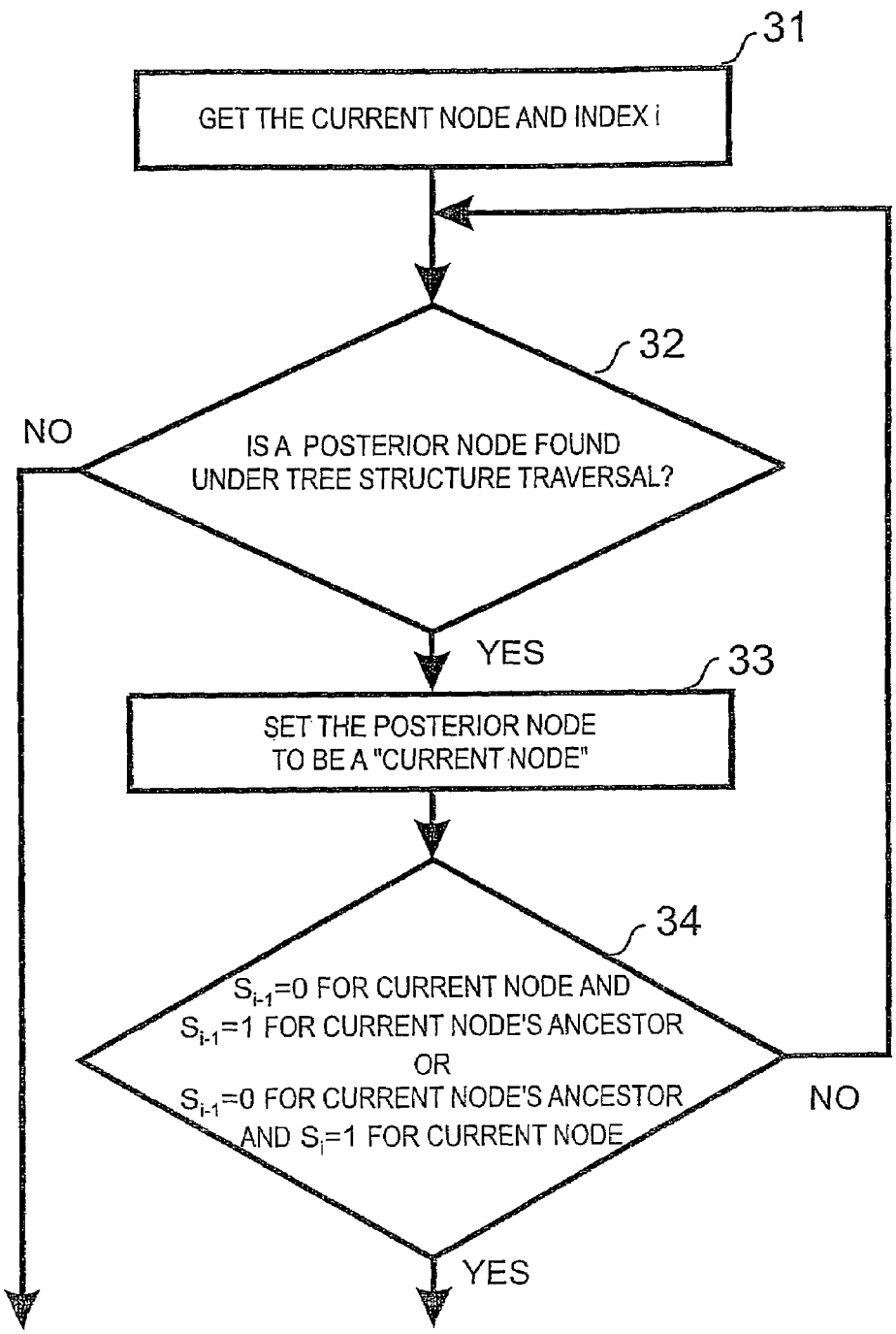

On FIG. 2 the succession of initial image decomposition operations into spectrum subband is shown.

On FIGS. 3-6 block scheme of different aspects of operations according to the claimed invention is illustrated.

Figure 7:
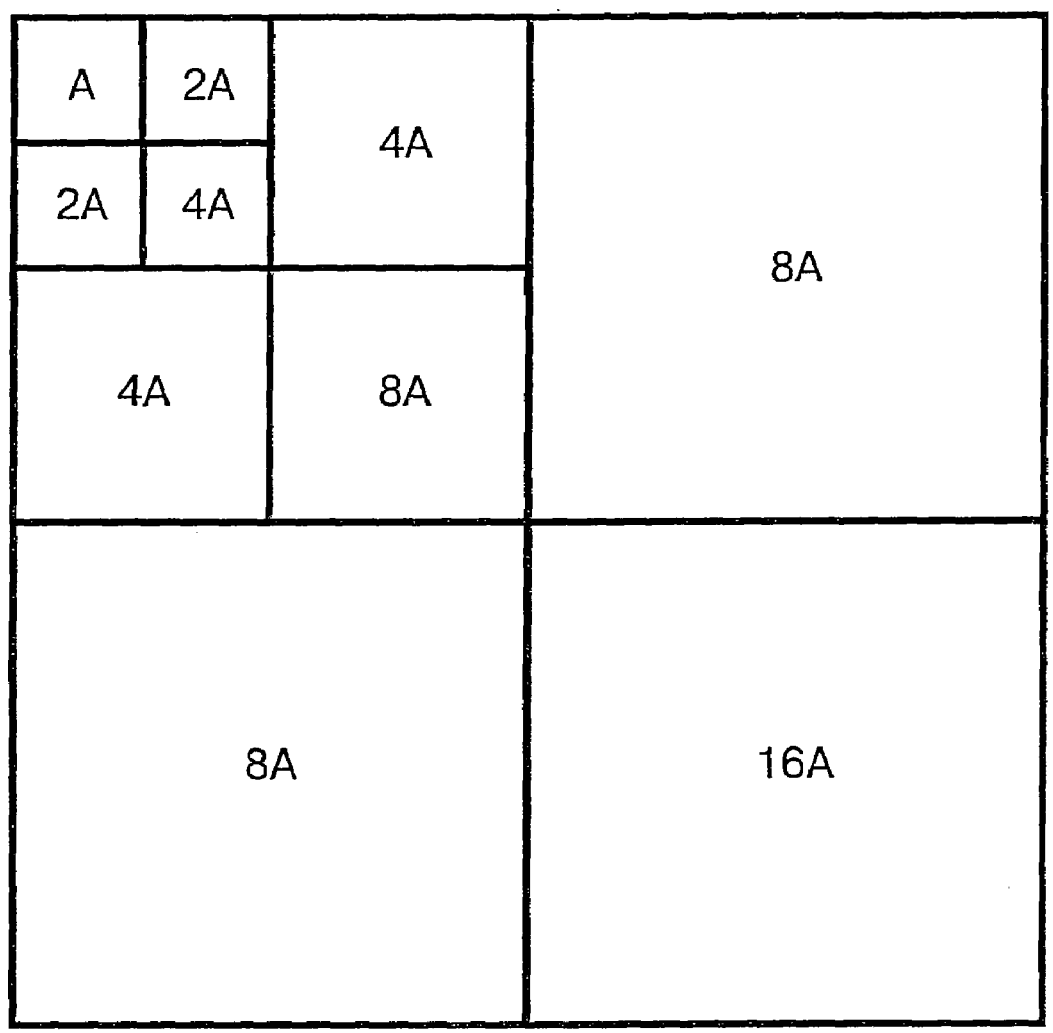

On FIG. 7 the structure of components of basis threshold array $T_0$ is shown.

FIGS. 8-20 illustrate alternative and/or detailed concepts of the present application.

DETAILED DESCRIPTION OF THE INVENTION

Let us suppose that we have an image of $2^N \times 2^N$ pixels. Initial image possesses utmost high spatial capacity and depicts the smallest details. Applying spectral decomposition of lines and columns of the image using wavelet-functions basis and dividing each spectrum into low frequency and high frequency constituents, we get four arrays of spectrum coefficients with size $2^{N-1} \times 2^{N-1}$. These arrays contain: low frequency coefficients of lines and columns decomposition, included in the LL1 array; low frequency coefficients of lines decomposition and high frequency coefficients of columns decomposition, included in the LH1 array; high frequency coefficients of lines decomposition and low frequency coefficients of columns decomposition, included in the HL1 array; and high frequency coefficients of lines and columns decomposition, included in the HH1 array. LL1 array can be subject to further decomposition into low-high frequency spectrum subband; as the result, four arrays LL2, LH2, HL2 and HH2 will be formed, the size of which will be twice less than the previous one, i.e. $2^{N-2} \times 2^{N-2}$. The process of spectrum subband formation reflects the successive transition to examination of lower and lower frequency spectrum constituents of initial image spectrum. This process is terminated at N-step when the size of LLN array becomes equal to 1×1. The scheme of the spectrum transformation described above is illustrated on FIG. 1, and succession of subband formation is illustrated on FIG. 2.

On FIG. 2 the succession of transformation of initial data two-dimension array 1 is presented, by means of filtering of low spatial frequencies in lines by means of filter 2 and of high spatial frequencies in lines with the help of filter 8. Then the signal from output of filter 2 is transformed by filtering of low spatial frequencies in columns using filter 4 and of high spatial frequencies in columns using filter 6, and the signal from output of filter 8 is transformed by filtering of low spatial frequencies in columns using filter 10 and of high spatial frequencies using filter 12. At outputs of filters 4, 6, 10 and 12 data arrays LL, HL, LH and HH are formed. It should be noted, that the size of each array is twice less than the size of initial data array. Further, the procedure described above is applied to LL array until the size of low frequency subband will be the minimal possible. The object, received as the result of successive spectrum decomposition, looks like hierarchal tree, components in the nodes of which are connected to one another with ancestor-descendant relations. At that, decomposition coefficient related to ancestor always corresponds to lower frequency constituent of the spectrum, rather than the coefficient, related to descendant.

In the character of the functions, which are used for spectral decomposition of initial image, in this invention we purpose to use wavelet subband filter. The choice of wavelet-functions basis, optimal from the point of view of quality of image being transmitted with set compression coefficient, is a hard task. A number of criteria are know which are followed when choosing the basis. To such functions, smoothness of functions, accuracy of approximation, frequency selectivity of filter, and energy distribution, are referred.

When encoding the coefficient values of D spectrum decomposition of initial image, it is necessary to take into consideration absolute coefficient value and its sign. In order to transfer information about spectrum coefficients sign into the data flow, within the claimed method a separate bit array Z is formed, components of which are equal to 0 in those nodes, where D coefficients are nonnegative, and are equal to 1, correspondingly, in those nodes, where D coefficients are less than 0.

In order to carry out an effective data compression and to preserve high quality of the image being transmitted, it is necessary to reorganize D coefficients array and to transfer them to bit representation. For these purposes the sets of indexed threshold arrays $T_i$ are formed, one of which is a basis threshold array $T_0$. For each separate tree node, the components values of $T_i$ and $T_0$ arrays are connected by the relation $T_i=T_0/2^i$. The components values of $T_0$ array for nodes of LLN spectrum subband are determined in the encoding algorithm. For nodes of spectrum subbands corresponding to the previous decomposition levels, the components values of $T_0$ array are multiplied by two. In that way we secure the conditions for discrimination of high frequency constituntes of image spectrum when reorganizing a spectrum coefficients array according to significance criterion.

In order to realize the mentioned procedure of reorganization according to the claimed invention, the so-called "rival array" of coefficient M is formed. The formation of the array is carried out by means of successive transition from tree nodes, corresponding to the last level of decomposition, which do not have descendants, to their ancestors. At that transition, ancestor is given such M value that ratio $M/T_0$ in the tree node is equal to maximum number received in division of descendants' coefficients of the node D for all spectrum decomposition subbands in values of the corresponding thresholds $T_0$. Formation of rival array plays a key role in the claimed method of data compression for quality improvement of the image being transferred.

In order to establish if the threshold $T_i$ among descendants of the given node has a significant one, indexed set of bit arrays $S_i$ is formed. Components of the arrays are declared to be zero if the value of spectrum coefficient of rival array M in the given tree node is less than threshold value $T_i$. If the value of spectrum coefficient of rival array in the tree node equals or exceeds the threshold value, the component of the given array is declared to be equal to 1.

Further, the spectrum coefficients of initial image decomposition D are transformed into a bit code, represented by the set of arrays $B_i$. Components values of these arrays for D number, corresponding to the given node, are calculated using the formula $B_i=[2\{|D|/T_{i-1}\}]$, where figure brackets means operation of taking the fractional part of a number, and square brackets means operation of taking the whole part of a number.

For carrying out data encoding according to the principles of the invention, it is necessary to determine the order of tree examination. It is proposed to examine tree nodes beginning from the lower decomposition level to higher, and within each tree level it is proposed to examine nodes according to the set for this level order of examination. The structure of the tree and the order of examination of its nodes are considered fixed during the encoding and decoding processes. On FIG. 3 the succession of operations when transitioning to the next level during tree examination is shown. If the first place 31 the current node and threshold index value i are set. Then at 32 it is determined if there is a next node at the chosen threshold level that follows the current node according to the direction of the tree examination. In case there is, at the next step 33 the next level is considered current. After that at 34 the check-up of bit arrays S values, which correspond to the current node and to its ancestor at the current and previous threshold levels, is carried out. Namely, the next after the current node is considered the first after the current node, according to the direction of tree examination, for which either value $S_{i-1}=0$ and value $S_{i-1}=1$ for its ancestor, or value $S_i=1$ and value $S_{i-1}=0$ for its ancestor. If condition 34 is fulfilled, transition to the next node is considered fulfilled. If condition 34 is not fulfilled, then again at 32 it is determined if there is a next node at the chosen threshold level that follows the current node according to the direction of the tree examination.

Figure 4:
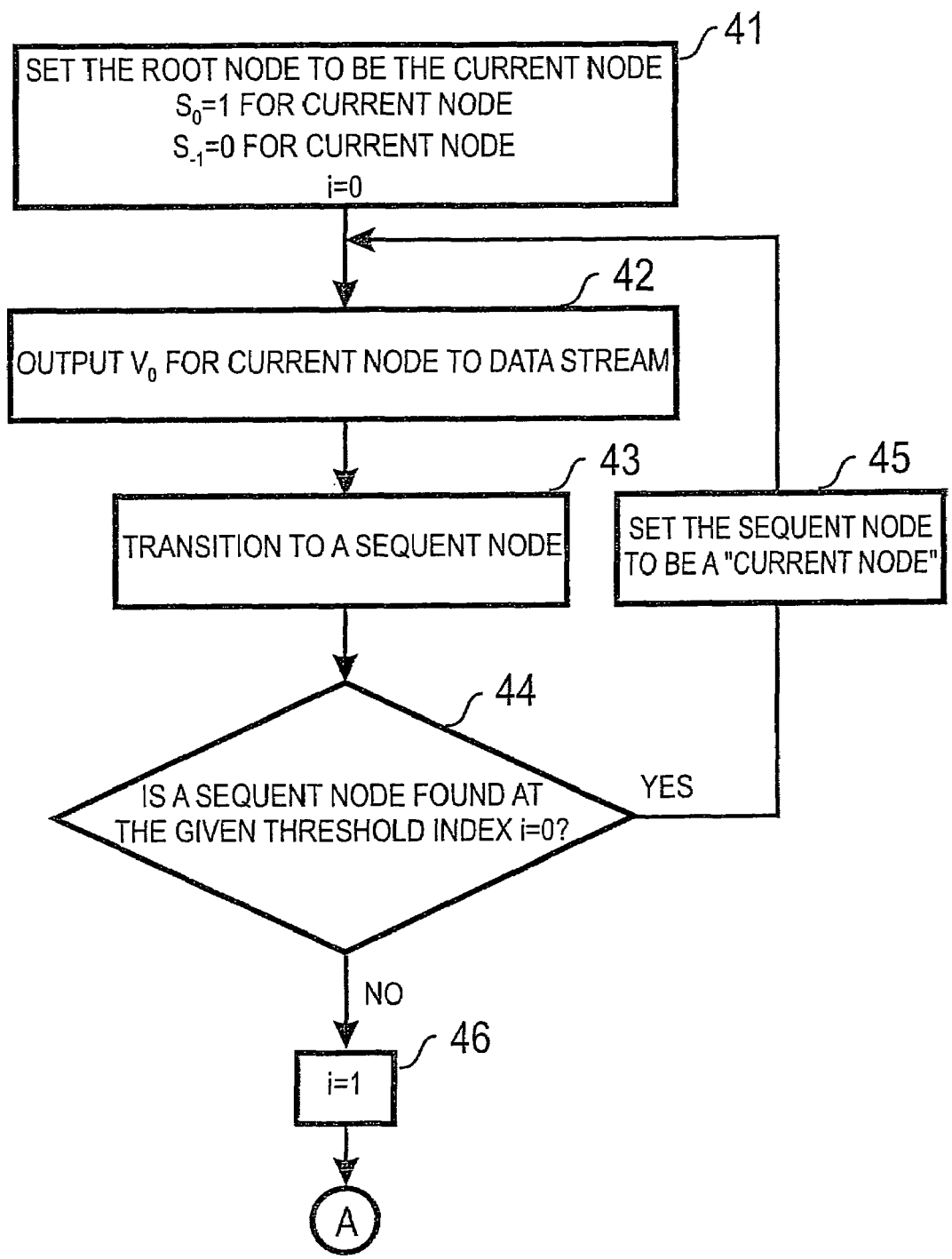
Figure 5:
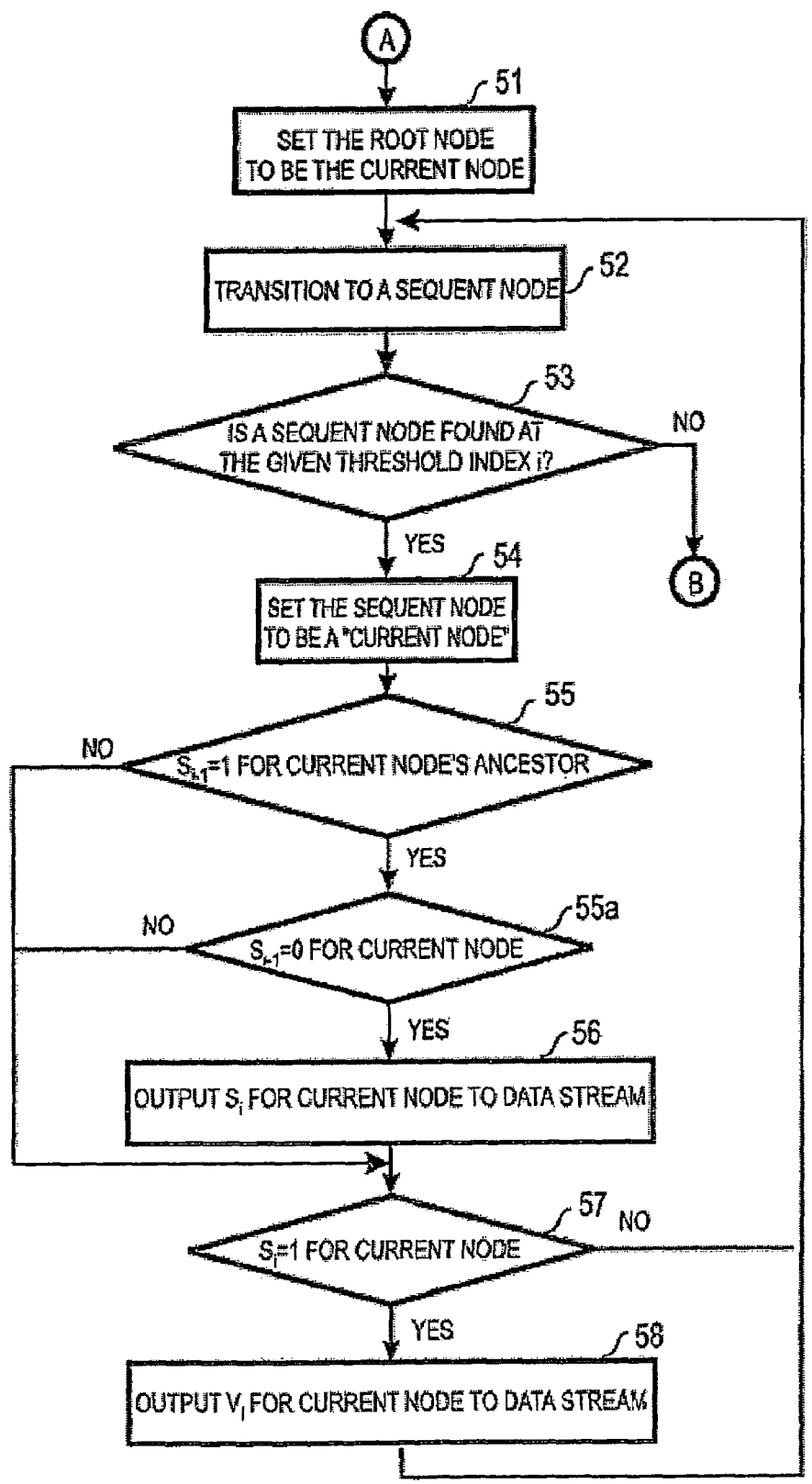
Figure 6:
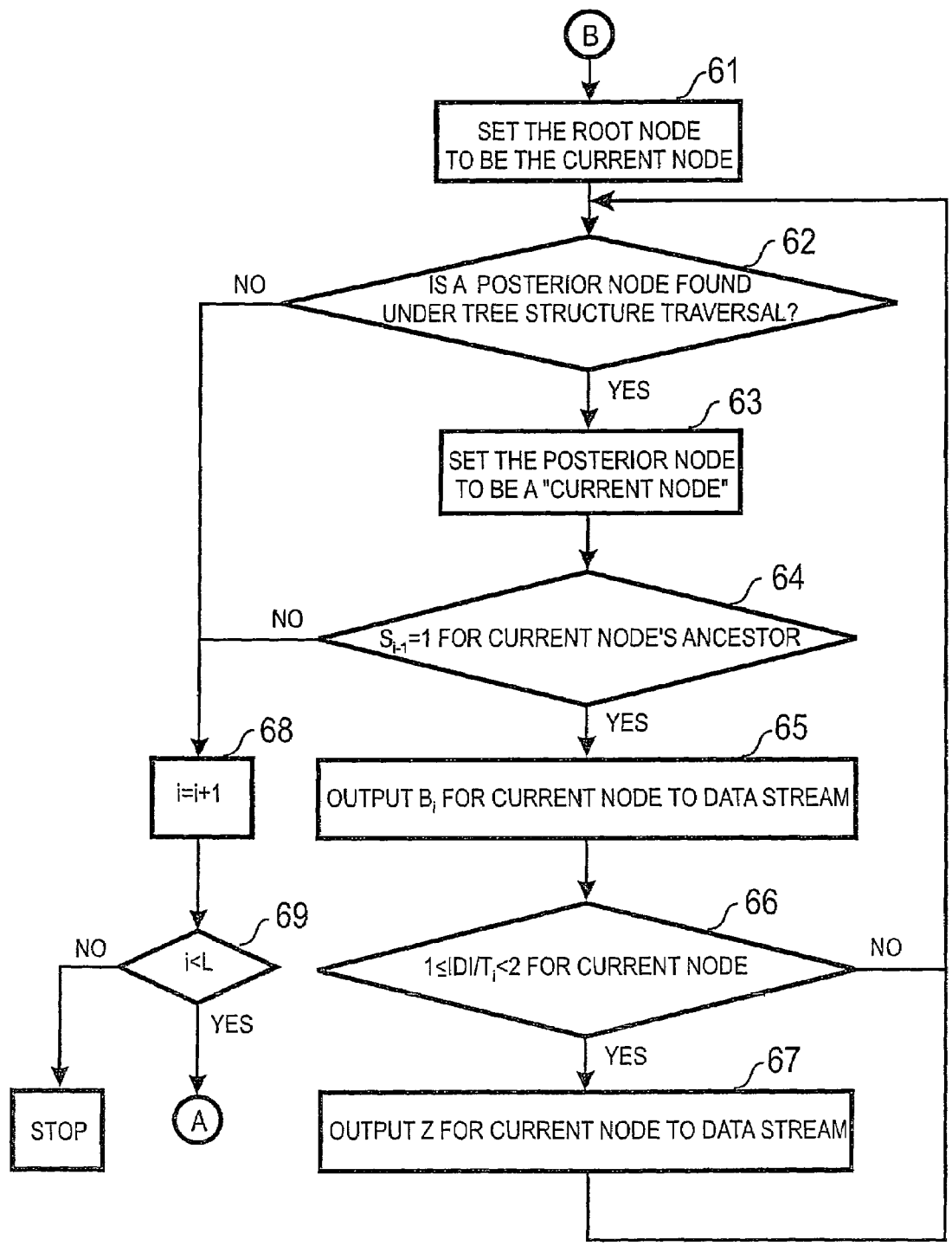

On FIGS. 4-6 the precess of data array encoding according to the principles of the invention is described. Before the beginning of encoding the L number of threshold arrays in the set is chosen, which is equal to the number of bits in the maximal coefficient of spectrum decomposition D. At the first step 41 the value of threshold index is considered i=0, the current node is considered tree root, the threshold value $T_0$ is chosen so that $S_0=1$ and $S_{-1}=0$. Then at 42 the value of vector array $V_0$, which was calculated in the tree root, is transferred to the flow. After that search, transition to the next tree node 43 according to the principles described above and shown on FIG. 3 is carried out. After check-up for the next node existence 44, in case it exists, the next node is declared current 45 ad the encoding process starts from input of operation 42. In case the next node is not detected, which is possible, for example, at the tree edges, the transition to the next threshold level 46 is carried out and tree root 51 is declared current node. On steps 52 and 54 the search and transition to the next tree node is carried out, after the next node was detected. Then the next node is declared current 54. Then the check ups of $S_{i-1}$ values for the ancestor of the current node 55 and of the current node 55a itself are successively realized. In case, the $S_{i-1}$ value for the ancestor of the current node is equal to 1, and $S_{i-1}$ value for the current node equals to 0, the value of $S_i$ array is transferred to the data flow for the given node 56. Then the check-up of this value is realized 57. In case the value $S_i$ for the current node is equal to 1, the value of $V_i$ array is additionally transferred to the data flow for the given node 58. After that the search and transition to the next tree node 52, 53 are realized according to the principles, described above and shown on FIG. 3.

In cases where, as the result of carrying out operation 53, the next tree node is not determined, the tree root 61 is declared the current node. Then tree nodes are successively examined according to the set order of examination and it is established, if there is a next node after the current one according to direction of examination 62. In case such node exists, on the next step 63 the next node is determined as current. After that the check-up 64 of the $S_{i-1}$ bit array value, which corresponds to the ancestor of the current node, is realized. In case the $S_{i-1}$ value for the ancestor of the current node is equal to 1, the value of $B_i$ array is transferred to the data flow for the current node 65. Then the check-up 66 of $1 \leq |D|/T_i < 2$ condition for the given node is realized. If the given condition is fulfilled, then the value of the Z array for the given node is transferred to the data flow. In the opposite case the encoding process is sent back to the input of operation 62.

In the next case, after the current node according to the direction of tree examination is absent or if $S_{i-1}$, for the ancestor of the current node equals to 0, the transition to the next threshold level 68 is carried out. Then based on the condition that index of the next in turn threshold level i does not exceed the value L, the encoding process is sent back to the input of operation 51.

On FIG. 7 the structure of the threshold array $T_0$ basis components is shown. In order for improvement of image quality being transmitted, it is proposed to form basis threshold array by means of doubling coefficients values at each transition to spectrum subband of the higher level.

Figure 8:
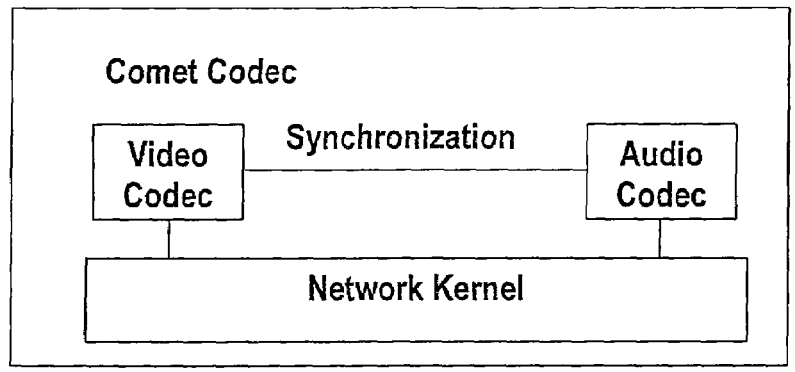

With continuing attention to the present application, disclosed below is the Comet Video Technology Codec as shown in FIG. 8, where Comet Video Technology Codec consists of three blocks:

Video Codec
Audio Codec
Network Kernel

All the three blocks interact in order to secure synchronized audio and video encoding and also for automatic adjustment of codecs when changing the communication channel or when the connection is terminated.

Video Codec carries out encoding and decoding and has the following working cycle:

Preprocessing
Encoding of key frames
Compensating methods and encoding of compensated frames
Decoding of key and compensated frames
Postprocessing Preprocessing—the necessary video image preparation for the following encoding, i.e. enhancement of quality (on the basis of available from the previous frames statistics).

Encoding of key frames is carried out on the basis of developed video compression methods using wavelet technology.

Compensating methods and encoding of compensated frames enable to transmit greater number of frames due to the fact that only the difference between them is being transmitted. This method should be closely connected with Preprocessing. The Compensating Methods should be also closely connected to the Network Kernel, because they are mostly dependent on the network disturbances.

Decoding of key and compensated frames is realized by means of back-encoding using wavelet technology.

Postprocessing is aimed at video quality enhancement by means of applying filters to video image for sharpness and color spectrum improvement.

Figure 9:
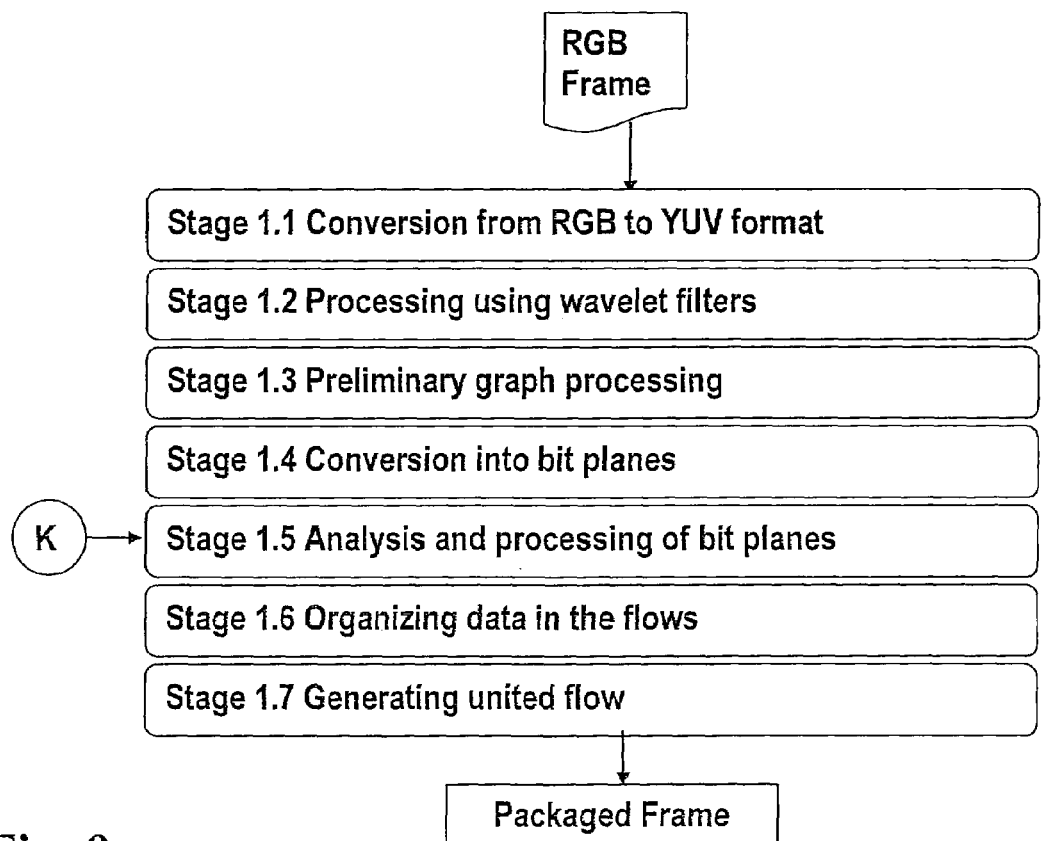

The key frame packaging process consists of seven stages as shown by FIG. 9.

Figure 14:
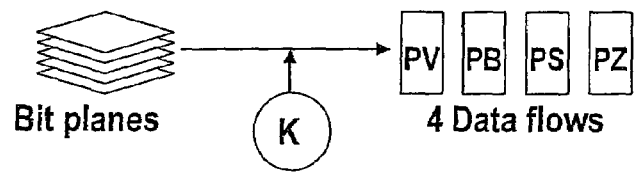

K-point in FIG. 14 is the point of application of methods illustrated in FIGS. 1-7 which were mentioned above.

Figure 10:
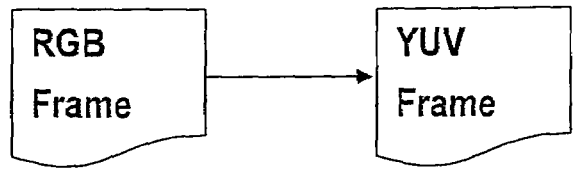

Description of Stage 1.1 as in FIG. 10: static frame in the RGB format is inputted. The frame is constituted of three planes: red, green and blue that together make up an image. Using standard, one-one functions, static frame is converted to another format called YUV, that, in its turn, is also a unity of three planes: brightness constituent Y and two color sub carriers, modulated by color signals U and V.

Such presentation of an image is more informative for further analysis.

Figure 11:
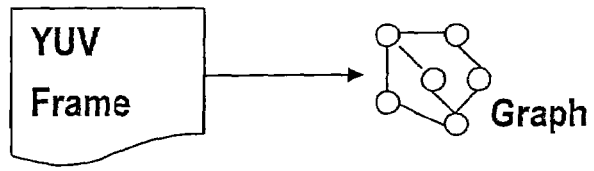

Description of Stage 1.2 as in FIG. 11: Static frame in YUV format is inputted. With the help of two filters based on wavelets, the image is being resolved into 2 constituents: high frequency and low frequency. The conversion is one-one and at the output is presented as a graph at the junctions of which the coefficients, as the result of resolution, are located. The wavelet filters were selected experimentally. (However, the wavelet filters can be easily modified, if necessary).

Figure 12:

Description of Stage 1.3 as in FIG. 12: In order to package the data at stages 1.4 and 1.5 the graph at stage 1.3 should meet the definite requirements.

Each group junction, except for the most upper (the root node), should have a "parent." At stage 1.3 we check a graph from stage 1.2 and replenish it to hierarchical tree structure, if necessary, i.e. we indicate "parents" for the junctions that don't have any.

Figure 13:
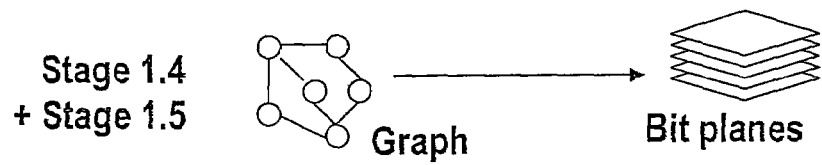

Description of Stage 1.4 as in FIG. 13: Beginning from this stage the packaging process starts. In order to make analysis at stage 1.5, graph from stage 1.3 should be subject to unique treatment and transformed into unique machine representation—bit planes.

Description of Stage 1.5 as in FIG. 14: The bit planes and data contained therein from stage 1.4 are being analyzed. On basis of this analysis, we organize data within the planes according to their significance. Then depending on the compressing ratio value that is used on this stage, we cast out all the data that is insignificant at this stage. (The greater compression ratio value, the more data is cast out). K-point in FIG. 14 is the point of application of methods illustrated in FIGS. 1-7 which were mentioned above. The data that remains is sorted out into 4 different data flows.

Figure 15:

Description of Stage 1.6 as in FIG. 15: In order to achieve greater data compression, the data in the flows is organized in a special way and is subject to additional statistic analysis.

Figure 16:
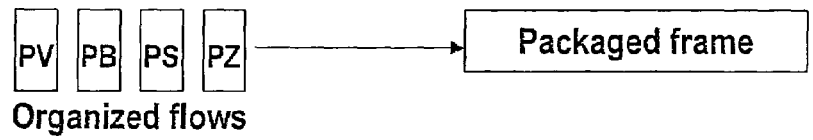
Figure 17:
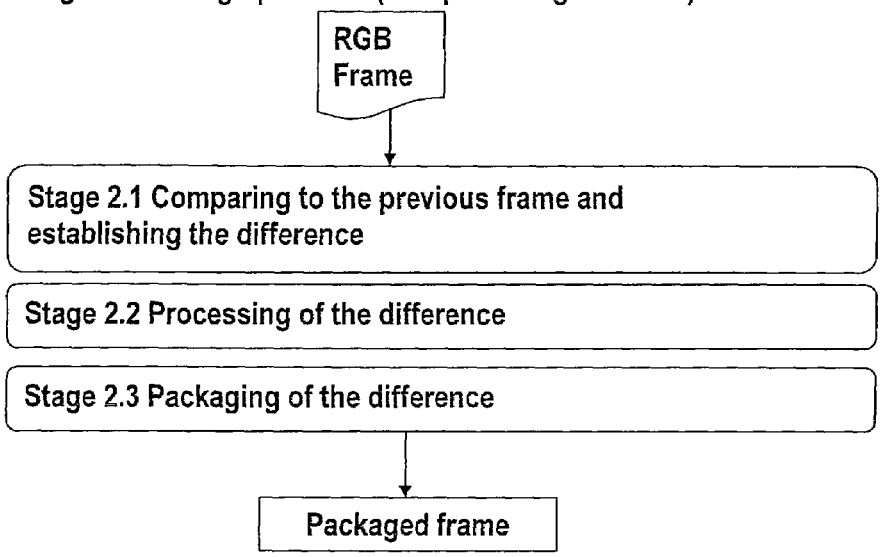

Description of Stage 1.7 as in FIG. 16: Organized flows are united into integrated structure, that is a packaged frame. The structure is then transferred for sending through the network or storing. One of the models for compensating frames processing is shown in FIG. 17 and for compensating frames packaging some modifications of method illustrated in FIGS. 6-7 may be used.

Audio Codec encodes the audio flow synchronically with the video flow.

Figure 18:
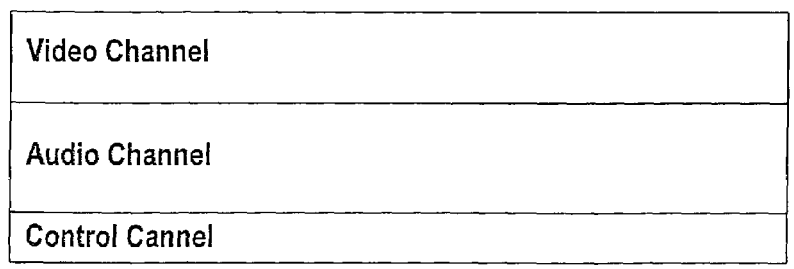

Network Kernel (such as shown in FIG. 18) should secure the well-timed delivery of data and is responsible for monitoring of the network for the purpose of network disturbances detection and, based on the statistics accumulated, carries out the adjustment of Video and Audio Compressors.

FIG. 18 displays the structure of the one-way data transfer channel. This channel consists of three flows:

Video Channel
Audio Channel
Control Channel

Video Channel is responsible for video frames delivery from Video Compressor.

Audio Channel is responsible for audio flow delivery from Audio Compressor.

Control Channel is responsible for a wide range of service functions:

Carrying out of connection of two or more users of the clients programs before the communication session starts.

Synchronizing of video and audio flows.

Notification on network disturbances and data loss.

Carrying out of short messages exchange between the users (chat).

Figure 19:
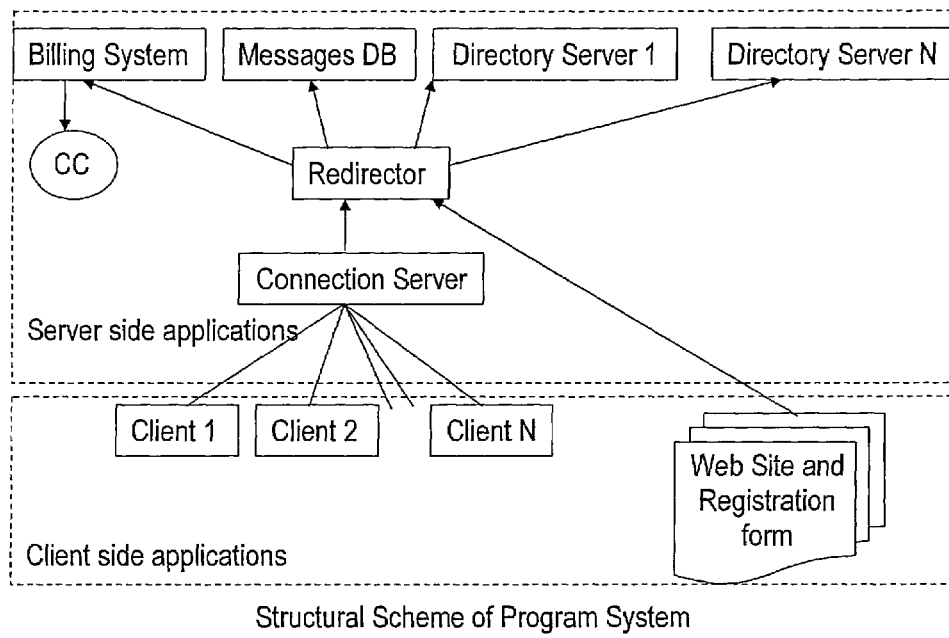
Figure 20:
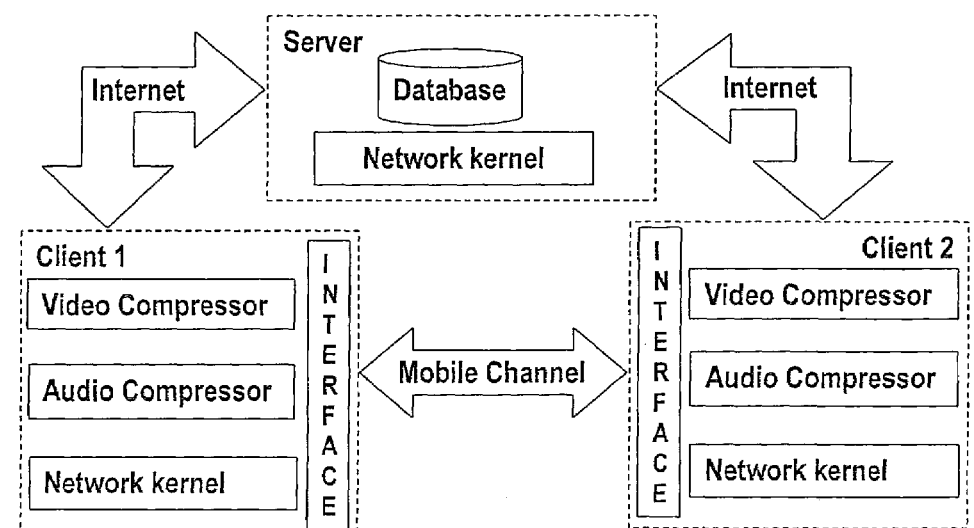

FIG. 19 and FIG. 20 illustrate a model of the program system for transmitting audio and/or video information through Internet and mobile channels based on Comet Video Technology Codec, mentioned above.

In the detailed description of the invention the concrete and the most preferable realization of the method is presented. The detailed description of the method steps and their specific parameters does not on any account mean that the invention is exhausted by the presented description. The additional advantages of the claimed method and its modifications as well can be found at its realization according to the general inventive ideas of the applicants.

We claim:

1. A method of data compression, said method comprising the steps:

representing said data as an array D of wavelet decomposition coefficients, creating a tree map of said coefficients formed with a root node and consequently connected nodes wherein each node except the root node is a descendant of the corresponding ancestor, creating an array Z which components corresponding to said nodes are equal to 0 if the corresponding coefficient D has positive or zero value and they are equal to 1 if coefficient D has negative value, creating a set of threshold arrays $T_i = T_0/2^i$ where $T_0$ is a basic threshold array, i is a threshold index, creating an array M whereas the value of $M/T_0$ ratio for each node is equal to maximum value of $|D|/T_0$ ratio among the all descendants of the given node, creating a set of arrays $S_i$ which components are equal to 0 if the corresponding to given node value of array M component is less than the value of threshold array $T_i$ component and equal to 1 if the corresponding value of array M component is equal or more than the value of threshold array $T_i$ component, creating a set of arrays $B_i$ which components are equal to the whole part of doubled fractional part of $|D|/T_{i-1}$ ratio creating a V-set of vector-arrays $V_i$ including the components of the arrays, $S_i$, $B_i$ corresponding to the descendants of the given node, and the components of the array $Z_i$ corresponding to those descendants of the given node which $B_i$ component is equal to 1, and creating data streams of V, S, B, Z components, for entropy coding procedures of said V, S, B, Z data streams.

2. A method of claim 1 wherein the values of the components of basic threshold array $T_0$ are increased twice for each sequent subband.

3. A method of data compressions, said method comprising the steps:

representing said data as an array D of wavelet decomposition coefficients, creating a tree map of said coefficients formed with a root node and consequently connected nodes wherein each node except the root node is a descendant of the corresponding ancestor, creating an array Z which components corresponding to said nodes are equal to 0 if the corresponding coefficient D has positive or zero value and they are equal to 1 if coefficient D has negative value, creating a set of threshold arrays $T_i = T_0/2^i$ where $T_0$ is a basic threshold array, i is a threshold index, creating an array M whereas the value of $M/T_0$ ratio for each node is equal to maximum value of $|D|/T_0$ ratio among the all descendants of the given node, creating a set of arrays $S_i$ which components are equal to 0 if the corresponding to given node value of array M component is less than the value of threshed array $T_i$ component and equal to 1 if the corresponding value of array M component is equal or more than the value of threshold array $T_i$ component, creating a set of arrays $B_i$ which components are equal to the whole part of doubled fractional part of $|D|/T_{i-1}$, and transmitting data of the set of arrays $B_i$, as compressed data.

4. A method of claim 3 further comprising the steps of creating a V-set of vector-arrays $V_i$ including the components of the arrays $S_i$, $B_i$ corresponding to the descendants of the given node, and the components of the array $Z_i$ corresponding to those descendants of the given node which $B_i$ component is equal to 1, creating data streams of V, S, B, Z components, for entropy coding procedures of said V, S, B, Z data streams.

5. A method of claim 3 wherein the values of the components of basic threshold array $T_0$ are increased twice for each sequent subband.

* * * * *